United States Patent
Watanabe

(10) Patent No.: US 8,360,397 B2
(45) Date of Patent: Jan. 29, 2013

(54) BALL SCREW DEVICE

(75) Inventor: Hajime Watanabe, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 441 days.

(21) Appl. No.: 12/734,664

(22) PCT Filed: Nov. 13, 2008

(86) PCT No.: PCT/JP2008/070653
§ 371 (c)(1),
(2), (4) Date: May 14, 2010

(87) PCT Pub. No.: WO2009/063929
PCT Pub. Date: May 22, 2009

(65) Prior Publication Data
US 2010/0252789 A1    Oct. 7, 2010

(30) Foreign Application Priority Data

Nov. 16, 2007    (JP) .................................. 2007-298208

(51) Int. Cl.
| | |
|---|---|
| B23Q 3/02 | (2006.01) |
| B66F 3/22 | (2006.01) |
| B66F 3/08 | (2006.01) |
| B66F 9/16 | (2006.01) |
| B66F 3/36 | (2006.01) |
| B66F 3/18 | (2006.01) |
| B60S 9/02 | (2006.01) |

(52) U.S. Cl. .......... 254/98; 254/418; 254/425; 254/100; 254/103; 254/97

(58) Field of Classification Search ................. 254/98, 254/97, 103, 100, 418–425
See application file for complete search history.

(56) References Cited

U.S. PATENT DOCUMENTS

| | | | |
|---|---|---|---|
| 4,479,397 A | 10/1984 | Jelinek et al. | |
| 5,554,899 A | 9/1996 | Teramachi | |
| 6,425,604 B1 * | 7/2002 | Schubert et al. | 280/763.1 |

FOREIGN PATENT DOCUMENTS

| | | |
|---|---|---|
| JP | 60-18654 A | 1/1985 |
| JP | 3-110246 | 11/1991 |
| JP | 6-300106 | 10/1994 |
| JP | 7-305753 | 11/1995 |

OTHER PUBLICATIONS

European Search Report dated Oct. 13, 2010.

* cited by examiner

*Primary Examiner* — Monica Carter
*Assistant Examiner* — Nirvana Deonauth
(74) *Attorney, Agent, or Firm* — McGinn IP Law Group, PLLC

(57) ABSTRACT

In a ball screw device, a ball screw linear-movement member is screwed with a ball screw rotary member and configured to linearly move in accordance with a relative rotation with the ball screw rotary member. A housing is holding the ball screw rotary member. A motor is disposed in a motor chamber of the housing, and configured to rotate the ball screw rotary member with a rotor coupled to the ball screw rotary member. A stopper is configured to collide with a brake when an amount of a relative linear movement between the ball screw rotary member and the ball screw linear-movement member becomes no less than a prescribed amount. The brake is configured to decelerate rotation of the rotor by the collision of the stopper with respect to the brake.

3 Claims, 1 Drawing Sheet

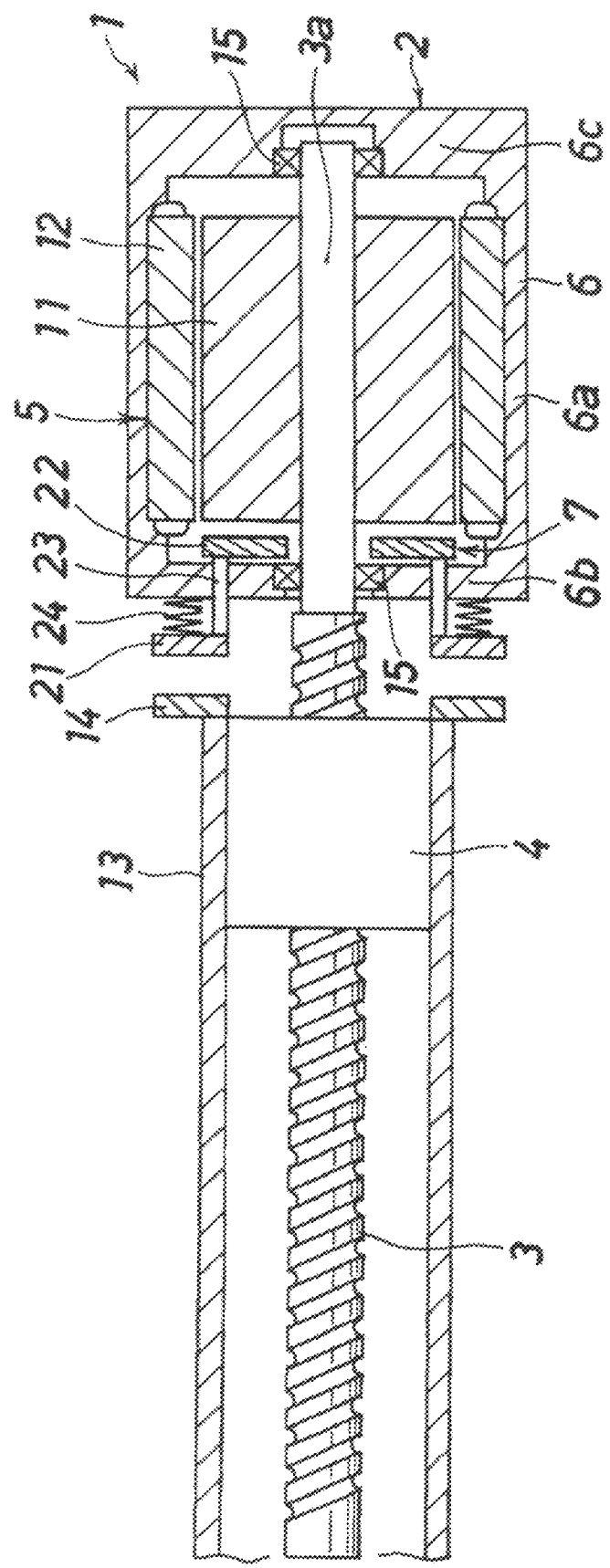

BALL SCREW DEVICE

TECHNICAL FIELD

The present invention relates to a ball screw device, and more particularly, relates to the ball screw device which is integrated with a motor.

BACKGROUND ART

A ball screw device including a screw shaft and a ball screw nut which is screwed with the screw shaft via balls is often used as an electric actuator or a damper. For example, Japanese Patent Publication No. 6-300106A, discloses an electric actuator incorporating a ball screw device wherein a rotor of a motor is connected to a ball screw nut, so that the ball screw nut is rotated to linearly move a screw shaft in an axial direction thereof.

DISCLOSURE OF THE INVENTION

Problems to be Solved by the Invention

When an excessive axial tension is loaded to a ball screw device, there is a case where a brinelling is formed in a raceway part of the ball screw. Particularly in the ball screw device integrated with the rotor of the motor, when rotation or linear movement of the ball screw is suddenly stopped, the brinelling is likely formed because rotation inertia of the rotor of the motor is large. In order to prevent formation of the brinelling on the ball screw raceway, the whole ball screw device may be made large to enhance the rigidity thereof. However, it is not favorable because an inertia moment is increased.

An object of the invention is to provide a ball screw device in which formation of a brinelling in a raceway part of the ball screw is prevented.

How to Solve the Problems

According to the invention, there is provided a ball screw device, comprising:
a ball screw rotary member;
a ball screw linear-movement member, screwed with the ball screw rotary member and configured to linearly move in accordance with a relative rotation with the ball screw rotary member;
a housing, holding the ball screw rotary member;
a motor, disposed in a motor chamber of the housing, and configured to rotate the ball screw rotary member with a rotor coupled to the ball screw rotary member;
a brake; and
a stopper, configured to collide with the brake when an amount of a relative linear movement between the ball screw rotary member and the ball screw linear-movement member becomes no less than a prescribed amount,
wherein the brake is configured to decelerate rotation of the rotor by the collision of the stopper with respect to the brake.

For example, the brake comprises: a damper configured to receive the stopper prior to the collision of the stopper with respect to the housing; a brake plate disposed between the damper and the rotor of the motor so as to oppose the rotor of the motor across a gap of a prescribed dimension; a coupler coupling the brake plate and the damper; and an urging member maintaining the gap between the brake plate and the rotor of the motor.

The ball screw rotary member may be a screw shaft (in this case, the ball screw linear-movement member is a ball screw nut). Alternatively, the ball screw rotary member may be a ball screw nut (in this case, the ball screw linear-movement member is a screw shaft).

The ball screw device according to this invention may be used as an actuator (in such an embodiment that the ball screw nut is rotated by the motor, whereby the screw shaft is linearly moved, or in such an embodiment that the screw shaft is rotated by the motor, whereby the ball screw nut is linearly moved). Alternatively, the ball screw device may be used as a damper (in such an embodiment that the screw shaft is linearly moved by an external force, whereby the ball screw nut is rotated, so that an electromagnetic force generated from the motor serves as a damping force, or in such an embodiment that the ball screw nut is linearly moved by an external force, whereby the screw shaft is rotated, so that an electromagnetic force generated from the motor serves as a damping force).

In either case, the ball screw linear-movement member reciprocally and linearly moves, and usually, it is provided a stopper for preventing the movement of no less than a prescribed amount in a prescribed direction (referred to as "an advancing direction" in this specification. This "advancing direction" means a moving direction to be collided with the stopper, and specifically, may be any of upward, downward, forward, rearward, rightward, leftward, and other directions). The stopper may be formed by providing a flange part, on the ball screw linear-movement member, which is configured to be butted against the housing when the amount that the ball screw linear-movement member has moved becomes no less than the prescribed amount. Alternatively, the stopper may be provided on a member which linearly moves integrally with the ball screw linear-movement member, or may be provided on another member which does not linearly move (the housing, or the hollow shaft). Because a limit position in the advancing direction of the ball screw linear-movement member is defined by the stopper, the ball screw linear-movement member is forcibly stopped, when it has arrived at the limit position. In a case where the ball screw linear-movement member moves at a high speed on this occasion, brinelling would be formed in a raceway of the ball screw due to large rotation inertia of the ball screw rotary member generated by the sudden stop of the ball screw linear-movement member.

Conventionally, in a case where the movement of the ball screw linear-movement member is forcibly stopped, also the inertia of the rotor of the motor exerts on the ball screw rotary member, so that the brinelling may be likely formed.

According to the ball screw device in this invention, the rotation speed of the rotor of the motor is reduced by the brake prior to collision of the stopper with respect to the housing. Hence, the rotation inertia of the rotor of the motor is reduced so that a shock load to be exerted on the ball screw linear-movement member is reduced. Accordingly, it is possible to prevent formation of the brinelling on the raceway of the ball screw.

In the above described ball screw device, there may be formed a spline for guiding the linear movement of the screw shaft may be integrally formed with the screw shaft serving as the ball screw linear-movement member. Incidentally, the spline may be a ball spline or may be a spline of an engaging type such as an involute spline.

Advantageous Effects of the Invention

According to the ball screw device in this invention, the rotation speed of the rotor of the motor is reduced by the brake prior to the collision of the stopper with respect to the housing so that the load to be exerted on the ball screw linear-movement member can be reduced. Hence, formation of the brinelling on the raceway of the ball screw can be prevented. In this manner, it is possible to solve the problem that the inertia moment increases in a case where the whole device is made larger to secure its rigidity. Therefore, downsizing and weight reduction of the ball screw device can be attained.

BRIEF DESCRIPTION OF THE DRAWINGS

FIG. 1 is a longitudinal sectional view showing a ball screw device according to one embodiment of the invention.

BEST MODE FOR CARRYING OUT THE INVENTION

Embodiments of the invention will be described below with reference to the accompanying drawings. It is to be noted that terms "right" and "left" in the following description respectively correspond to a right side and a left side in the drawing.

FIG. 1 is a longitudinal sectional view showing a ball screw device according to one embodiment of the invention.

A ball screw device 1 comprises: a housing 2; a steel screw shaft 3 having a right part 3a disposed in the housing 2 so as to extend in a right-left direction; a ball screw nut 4 screwed with the screw shaft 3 via balls; a motor 5 including a rotor 11 and a stator 12, and disposed in a motor chamber 6 of the housing 2; and a brake 7 for decelerating the rotor of the motor 11 when a stopper 14 collides with the housing 2.

The motor chamber 6 includes a cylindrical part 6a, and right and left bottom walls 6b, 6c closing right and left openings of the cylindrical part 6a. The right part 3a of the screw shaft 3 is rotatably held by the right and left bottom walls 6b, 6c of the motor chamber 6 via a bearing 15.

This ball screw device 1 is used as an actuator of such a type that the screw shaft 3 is rotated by the motor 5, and the ball screw nut 4 is linearly moved in accordance with the rotation.

The stator 12 of the motor 5 is fixed to an inner periphery of the cylindrical part 6a of the motor chamber 6 so that the rotor 11 of the motor 5 is fixed to an outer periphery of the screw shaft 3.

A hollow shaft 13 is fixed to the ball screw nut 4 so as to linearly move in the right-left direction integrally with the ball screw nut 4. The hollow shaft 13 is provided with the stopper 14 for defining a limit position of the rightward linear movement.

The brake 7 comprises: a damper 21 disposed between the left bottom wall 6b of the motor chamber 6 and the stopper 14 to receive the stopper 14 without the collision of the stopper 14 with respect to the bottom wall 6b so that the damper 21 moves integrally with the stopper 14; a brake plate 22 disposed between the left bottom wall 6b of the motor chamber 6 and the rotor of the motor 11 so as to oppose the rotor of the motor 11 across a gap of a prescribed dimension; a coupler 23 passing through the left bottom wall 6b of the motor chamber 6 and coupling the brake plate 22 to the damper 21; and a spring 24 serving as an urging member which is disposed between a left face of the left bottom wall 6b of the motor chamber 6 and a right face of the damper 21, and urges the damper 21 leftward to maintain the gap between the brake plate 22 and the left face of the rotor of the motor 11.

When the stopper 14 moves rightward, the stopper 14 first collides with the damper 21 thereby to move the damper 21 rightward against an urging force of the spring 24. The brake plate 22 which is coupled (integrated) to the damper 21 by the coupler 23 moves rightward in accordance with the rightward movement of the stopper 14, so that the damper 21 comes into contact with the left face of the rotor of the motor 11, without the collision of the stopper 14 with respect to the left bottom wall 6b of the motor chamber 6, thereby to exert a braking force on the rotor of the motor 11. Accordingly, the rotation of the rotor of the motor 11 is braked, so that the rotation speed of the rotor of the motor 11 is reduced.

In a conventional case where the stopper 14 collides with the left bottom wall 6b of the motor chamber 6 to suddenly stop the linear movement of the ball screw nut 4, the screw shaft 3 and the rotor of the motor 11 would continue to rotate due to their rotation inertia. Then, the rotation inertia exerts a large force between the screw shaft 3 and the ball screw nut 4.

In contrast, in the ball screw device 1 according to the invention, the rotation speed of the rotor of the motor 11 is gradually reduced by the brake 7, without the collision between the stopper 14 and the left bottom wall 6b of the motor chamber 6. Hence, the rotation inertia of the rotor of the motor 11 and the screw shaft 3 to be exerted between the screw shaft 3 and the ball screw nut 4 is also gradually reduced. In this manner, formation of the brinelling on the ball screw raceway is prevented.

This ball screw device 1 may be preferably used as an electromagnetic damper of an automobile, for example, beside as the actuator. The electromagnetic damper is a damper which converts an axial movement transmitted from tires into a rotary movement by a ball screw mechanism, and takes this rotary movement in the motor 5 to utilize an electromagnetic force generated from the motor 5 as a damping force. In a case where a bump stopper provided in a linearly movable part collides with the housing 2 (for example, a motor flange or the like) when a suspension is brought into an over-stroke condition at the time of overriding a protuberance or the like, the motor 5 which has been rotating at a high speed is suddenly stopped so that an excessive axial tension would be loaded on the ball screw parts 3, 4 by the inertia torque of the motor 5. It is required to protect the ball screw mechanism in such a case. According to the ball screw device 1 as described above, since the rotation speed of the rotor of the motor 11 is reduced by the brake without the collision of the stopper 14 with respect to the housing 2 (the motor chamber 6), the load exerted between the screw shaft 3 and the ball screw nut 4 due to the rotation inertia is reduced. Accordingly, the ball screw mechanism is protected and the brinelling is prevented from being formed.

In either case of the actuator and the damper, instead of the rotation of the screw shaft 3 as described above, the rotation of the nut may be employed. Also in this case, it is possible to adopt the above described structure.

The invention claimed is:
1. A ball screw device, comprising:
a ball screw rotary member;
a ball screw linear-movement member, screwed with the ball screw rotary member and configured to linearly move in accordance with a relative rotation with the ball screw rotary member;
a housing, holding the ball screw rotary member;
a motor, disposed in a motor chamber of the housing, and configured to rotate the ball screw rotary member with a rotor coupled to the ball screw rotary member;
a brake; and
a stopper, configured to collide with the brake when an amount of a relative linear movement between the ball screw rotary member and the ball screw linear-movement member becomes no less than a prescribed amount, wherein the brake is configured to decelerate rotation of the rotor by the collision of the stopper with respect to the brake.

2. The ball screw device as set forth in claim 1, wherein:
the ball screw rotary member comprises a screw shaft; and
the ball screw linear-movement member comprises a ball screw nut screwed with the screw shaft via balls.

3. The ball screw device as set forth in claim 1, wherein:
the brake comprises:

a damper, disposed in an outside of the housing and configured to receive the stopper;
a brake plate, disposed in an inside of the housing and configured to come in contact with the rotor to provide a braking force thereto; and
an urging member, urging the brake plate in a direction away from the rotor.

* * * * *